United States Patent [19]

Latzko et al.

[11] Patent Number: 4,599,769
[45] Date of Patent: Jul. 15, 1986

[54] MACHINE WITH ROTATING CUTTING TOOL

[75] Inventors: Richard I. Latzko, Glastonbury; George H. Marsland, Bristol; Johann F. Reuteler, West Hartford, all of Conn.

[73] Assignee: Colt Industries Operating Corp, West Hartford, Conn.

[21] Appl. No.: 709,996

[22] Filed: Mar. 12, 1985

Related U.S. Application Data

[63] Continuation of Ser. No. 405,434, Aug. 5, 1982, abandoned.

[51] Int. Cl.$^4$ .................... B23B 30/02; B23B 3/26; B23C 9/00
[52] U.S. Cl. .................... 29/26 A; 82/1.2; 82/1 C; 82/2 E; 408/181; 409/191
[58] Field of Search .................... 29/26 A, 568, 56.5, 29/562; 409/190, 191, 80, 237; 408/181, 153, 158; 82/1 R, 1 C, 1 Z, 2 E, 1.4; 318/571

[56] References Cited

U.S. PATENT DOCUMENTS

| | | | |
|---|---|---|---|
| 2,901,935 | 9/1959 | Keller et al. | 82/1 R |
| 3,169,416 | 2/1965 | Carlson et al. | 29/26 A |
| 3,180,187 | 4/1965 | McFerren | 82/1 R |
| 3,237,486 | 3/1966 | Gilbert et al. | 82/1.2 X |
| 3,656,377 | 4/1972 | Kosem | 318/571 |
| 3,710,659 | 1/1973 | Pagella et al. | 82/2 E |
| 3,902,386 | 9/1975 | Dressler et al. | 82/1.4 |
| 4,184,391 | 1/1980 | Eckle et al. | 82/1.2 |
| 4,250,775 | 2/1981 | Jerue et al. | 82/1.2 X |
| 4,411,177 | 10/1983 | Batistoni | 409/146 |

FOREIGN PATENT DOCUMENTS

| | | | |
|---|---|---|---|
| 2455402 | 7/1975 | Fed. Rep. of Germany | 409/191 |
| 2734126 | 2/1979 | Fed. Rep. of Germany | 82/2 E |
| 755453 | 8/1980 | U.S.S.R. | 409/181 |

*Primary Examiner*—William R. Briggs
*Attorney, Agent, or Firm*—Radford W. Luther; Richard A. Dornon

[57] ABSTRACT

A machine tool (10) with a rotating cutting tool (24) has a spindle assembly (20,48) mounted for rotation in a longitudinally movable headstock (18). The spindle assembly includes a spindle (48), driven by a motor (50) and an integral machining head (20) having a rotatably mounted drive screw (62). The drive screw carries a radially positionable follower (72) to which is connected a tool block (22) to define a radial slide for supporting the cutting tool. A drive shaft (82) extending through the spindle is in driving engagement with the drive screw such that rotation of the drive shaft relative to the spindle produces rotation of the drive screw and consequential radial movement of the follower and tool block. A motor (76) mounted on the spindle for rotation with the spindle is connected to the drive shaft for rotating it either a clockwise or counterclockwise sense to produce radial movement of the follower and tool block. A counterbalance block (70) is in threaded engagement with a threaded shaft (142) mounted in the machining head in driving connection with the drive shaft for providing dynamic balance. A tool changer assembly (38) is secured to a floor mounted support (46) for changing tools in the tool block.

18 Claims, 10 Drawing Figures

MACHINE WITH ROTATING CUTTING TOOL

This application is a continuation, of application Ser. No. 06/405,434, filed 8/5/82, now abandoned.

TECHNICAL FIELD

The present invention relates to machine tools having rotating cutting tools.

BACKGROUND ART

Cross feed heads carrying radially positionable rotating cutting tools for performing facing as well as a variety of other operations are known in the prior art. Such cross feed heads have been adapted for attachment to various forms of horizontal boring mills and have been capable of performing facing, contouring and thread forming work. The primary advantage offered by cross feed heads is that large workpieces may remain essentially stationary during machining, thereby enhancing safety and permitting the simplification of work holding devices. Examples of prior art cross feed heads are described in U.S. Pat. Nos. 3,311,003; 3,744,352; 3,902,386; 4,250,775; and 4,250,777.

Prior art cross feed head arrangements, although capable of satisfactorily performing numerous machining operations, have inherent limitations. Prominent among such limitations is the available range of radial travel and the maximum angular velocity (RPM) at which the head can be rotated. The range of radial travel is necessarily limited by the size of the head, which typically has been of relatively small diameter. The maximum velocity at which the head can be rotated is dependent upon the degree of dynamic imbalance occasioned in the head when the tool carried thereby is in a given radial position. The prior art has recognized that a head, which is dynamically unbalanced and rotated at high speed, will engender vibrations which adversely affect the surface being machined. For example, the cross feed head disclosed in U.S. Pat. No. 3,824,883 has a pair of cutters arranged for simultaneous radial movement of equal distances in opposite directions in order to provide a cross feed head which is dynamically balanced.

The slides in prior art cross feed heads have been positioned by various drives. The drives include worm gear, rack and pinion and cam arrangements. A major problem with such prior art drives is that they do not afford the superior accuracy and minimal friction which is a characteristic of precision screw assemblies. The accurance of precision screw assemblies has been widely recognized in that they are typically employed to drive the slides of machine tools and are incorporated in many precision measuring machines.

Another drawback of exisitng cross feed heads is their lack of versatility owing to their specialized functions and the fact that they are essentially attachments to exisitng machines. For example, state of the art cross feed heads are not adapted to perform a drilling type operation but can only complete finishing work on an already machined bore. It would obviously be highly desirable, in order to minimize machining time, to bore and finish without the necessity for mounting a cross feed head attachment after the boring work is completed.

DISCLOSURE OF INVENTION

The invention provides a general purpose machine having a rotating cutting tool with numerical control of the tool radius and angular velocity (RPM). A machine tool incorporating the invention may perform drilling, tapping, milling; contouring and thread forming work. The rotating cutting tool in a machine tool of the invention may be radially positioned with great accuracy and can be rotated at high speed without noticeable vibration, thereby permitting very excellent surface finishes to be obtained.

In accordance with the invention, a spindle assembly is mounted for rotation in a headstock. The spindle assembly includes a spindle and a machining head in driving connection therewith. A drive screw is rotatably mounted in the machining head and carries a radially positionable follower to which is connected a tool block for movement therewith, thereby defining a radial slide. The drive screw is rotated by a drive motor mounted in the spindle assembly. The machining head is also provided with a counter balance arrangement to insure dynamic balance during operation at various radial positions of the tool block. Incremental position transducers are operatively connected to the drive screw and the spindle in order to provide for numerically controlled operation of the rotating machining head.

A machine of the invention readily lends itself to provision of a tool changer and may offer the additional advantage of a capability to perform machining work, such as drilling, milling, tapping and reaming, with a tool aligned with the spindle axis. In addition, a machine of the invention is well-suited to multi-axis operation.

Accordingly, it is a primary object of the invention to provide a general purpose machine tool having a rotating machining head adapted to precisely perform various machining operations at high speed without vibration.

This and other objects and advantages of the invention will beomce more readily apparent from the following detailed description, when taken in conjunction with the accompanying drawings, in which:

BEST MODE OF CARRYING OUT THE INVENTION

Figure 1:
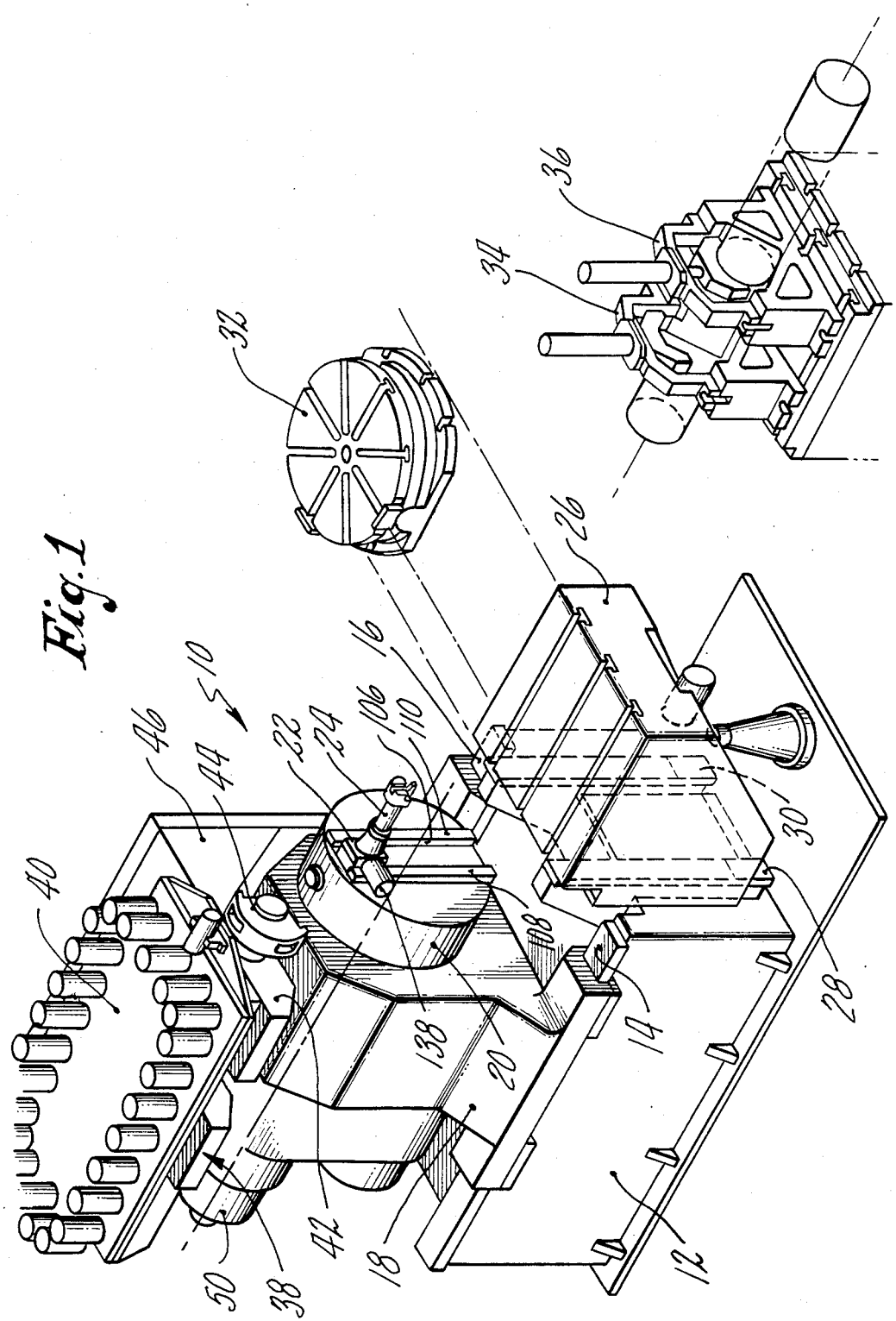
FIG. 1 is a perspective view of a preferred machine tool of the invention.
Figure 2:
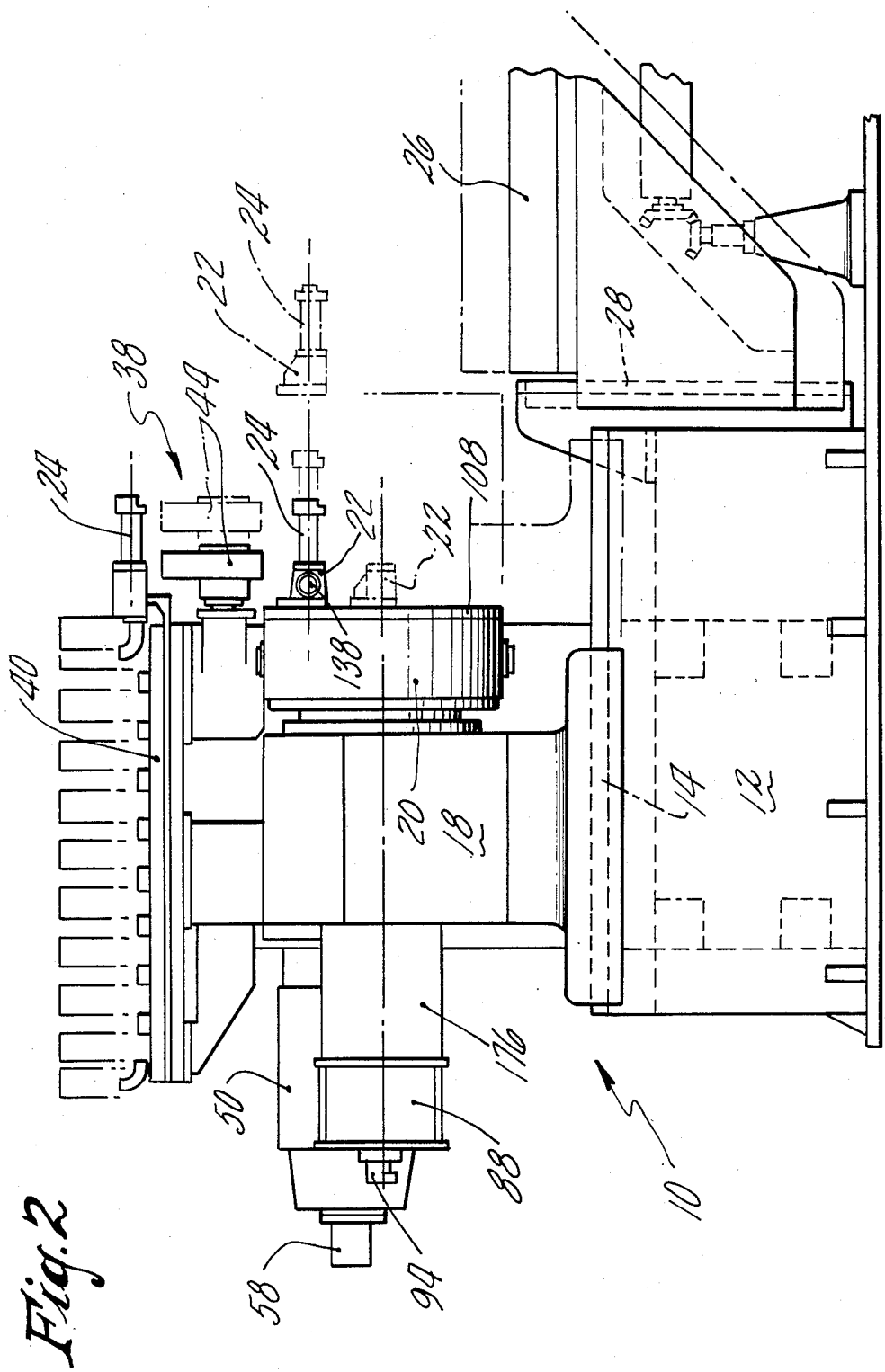
FIG. 2 is a slide elevational view of the machine tool of FIG. 1.

Referring to FIGS. 1 and 2, there is illustrated a machine tool of the invention. The machine tool 10 is adapted to machine surfaces of revolution upon stationary work pieces and perform conventional machining operations. The machine tool 10 may easily be controlled by a conventional CNC (Computer numerical control) unit or other appropriate control as will be explained hereinafter.

Machine tool 10 incorporates a bed 12 upon which are mounted longitudinally extending ways 14 and 16. A headstock or spindle support memer 18 is positioned upon the ways for longitudinal reciprocating movement thereover. Carried by the headstock 18 is a rotatable machining head 20 which embodies a radially positionable tool block or holder 22. A tool or toolholder 24 is secured to the tool block 22. A work supporting table 26 is mounted for vertical sliding movement upon ways 28 and 30 fastened to the bed 12. The table 26 may, for example, be provided with a rotary table 32 or pipe holding fixtures 34 and 36.

As a useful option, the machine tool 10 may be furnished with a tool changer assembly, generally indicated at 38. The tool changer assembly comprises as upper tool storage magazine 40 and a lower tool transfer mechanism 42 which includes a tool transfer arm 44 adapted to transfer tools between the magazine 40 and the tool block 22. The tool changer assembly 38 is rigidly secured to a floor mounted support and is vertically spaced from the headstock 46. The illustrated tool changer assembly is described in detail in U.S. Pat. No. 3,886,652.

Figure 3:
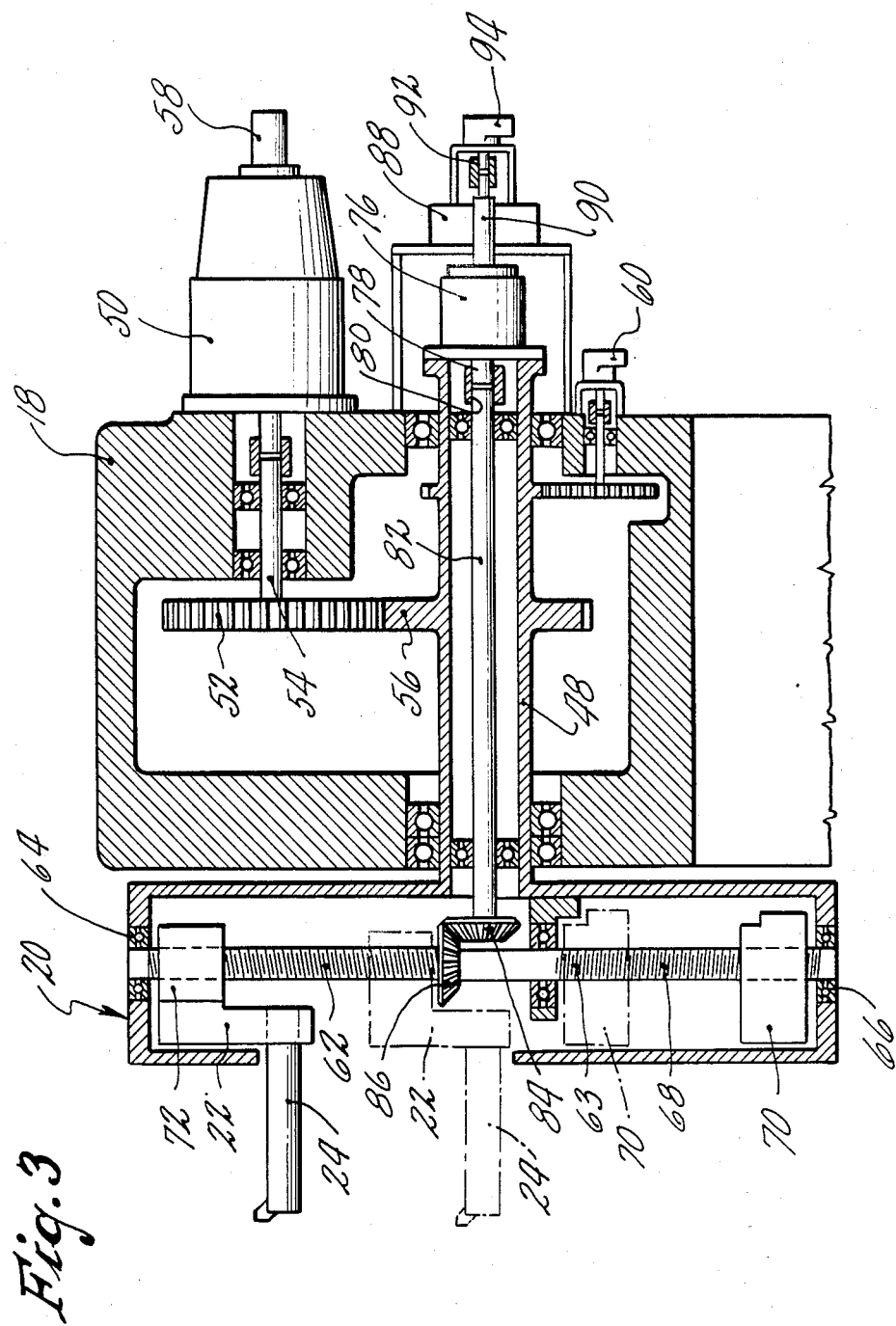
FIG. 3 is a schematic view of a typical machine tool of the invention.

An embodiment of the invention is depicted schematically in FIG. 3 in which a spindle assembly, comprising the machining head 20 and a spindle 48, is mounted in the headstock 18 for rotation. The spindle 48 is rotated by a main drive motor 50 via a gearbox schematically represented by a gear 52 connected to the shaft 54 of the motor 50. The spindle 48 carries a drive gear 56 in driving connection with the gearbox, as schematically illustrated by the meshing engagement between the gear 56 and the gear 52. The motor 50 incorporates the usual tachometer 58 for generating an analog signal indicative of speed. An incremental position transducer 60 (e.g., a shaft encoder) is drivingly connected to the spindle 48 for generating a series of pulses having a frequency proportional to the speed of rotation of the spindle.

A drive screw 62 and a shaft 63, extending thereform and in driving connection therewith, are mounted at their outboard ends for rotation in unison in the head 20 by means of bearings 64 and 66 positioned in the circumferential periphery of the head 20. The shaft 63 may have a threaded section 68 for carrying a counter balance block 70 for dynamically balancing the machining head 20 to permit rotation at any desired speed without vibration. Alternatively, the counter balance block 70 could be carried by another threaded shaft as will be subsequently explained. A follower 72 in threaded engagement with a diametrically opposed threaded section 74 is integral with the tool block 22 and moves radially as the shaft 62 rotates to thereby define a radial slide. It will be appreciated that as the shaft 62 turns, the follower and tool block assembly (i.e., the radial slide) 72, 22 and the counter balance block 70 will undergo equal and opposite radial movements. Hence, this arrangement allows for a high degree of dynamic balance irrespective of the distance of the slide from the spindle axis or head speed (RPM).

It should be noted that in order to permit a tool 24 in the tool block 22 to have its axis coincident with that of the spindle 48, it is necessary to appropriately configure the radial slide and the counterbalance block 70 so that no interferrence is occasioned therebetween as the tool axis becomes aligned with the spindle axis. In addition, it should be apparent that neither the radial slide nor the counter balance block 70 should present any clearance problems with respect to the gearing employed to drive the screw 62.

The drive screw 62 is rotated by a servo motor 76 fixedly mounted upon the rear end of the spindle 48 for rotation therewith. Motor 76 includes a tachometer built into the housing. The motor 76 has the front of its drive shaft 78 connected to a socket 80 in the rear end of a drive shaft 82 by a keying arrangement shown in FIGS. 8 and 9. The shaft 82 is mounted for rotation within the spindle itself. To the front end of the shaft 82 is fixedly attached a bevel gear pinion 84 which is in meshing engagement with a beveled drive gear 86 permanently mounted upon drive screw 62. By rotating the drive shaft 82 relative to the spindle 48, the bevel gear pinion 84 causes the beveled drive gear 86 to rotate and thereby rotate the drive screw 62. Rotation of the drive screw 62 moves the radial slide in a radially inward or outward direction in accordance with the sense of rotation of the drive shaft 82.

Power to the servo motor 76 is delivered through a slip-ring assembly 88 which is connected to a suitable source of power. A rear shaft extension 90 of the motor 76 is attached to the input shaft 92 of another incremental position transducer 94, similar to transducer 60, which is mounted upon the rear of the headstock 18. Because the position tranducer 94 is fixedly mounted, the signal generated thereby need not traverse a slip-ring assembly and therefore undergoes no distortion which could militate against precise numerical control.

Figure 4:
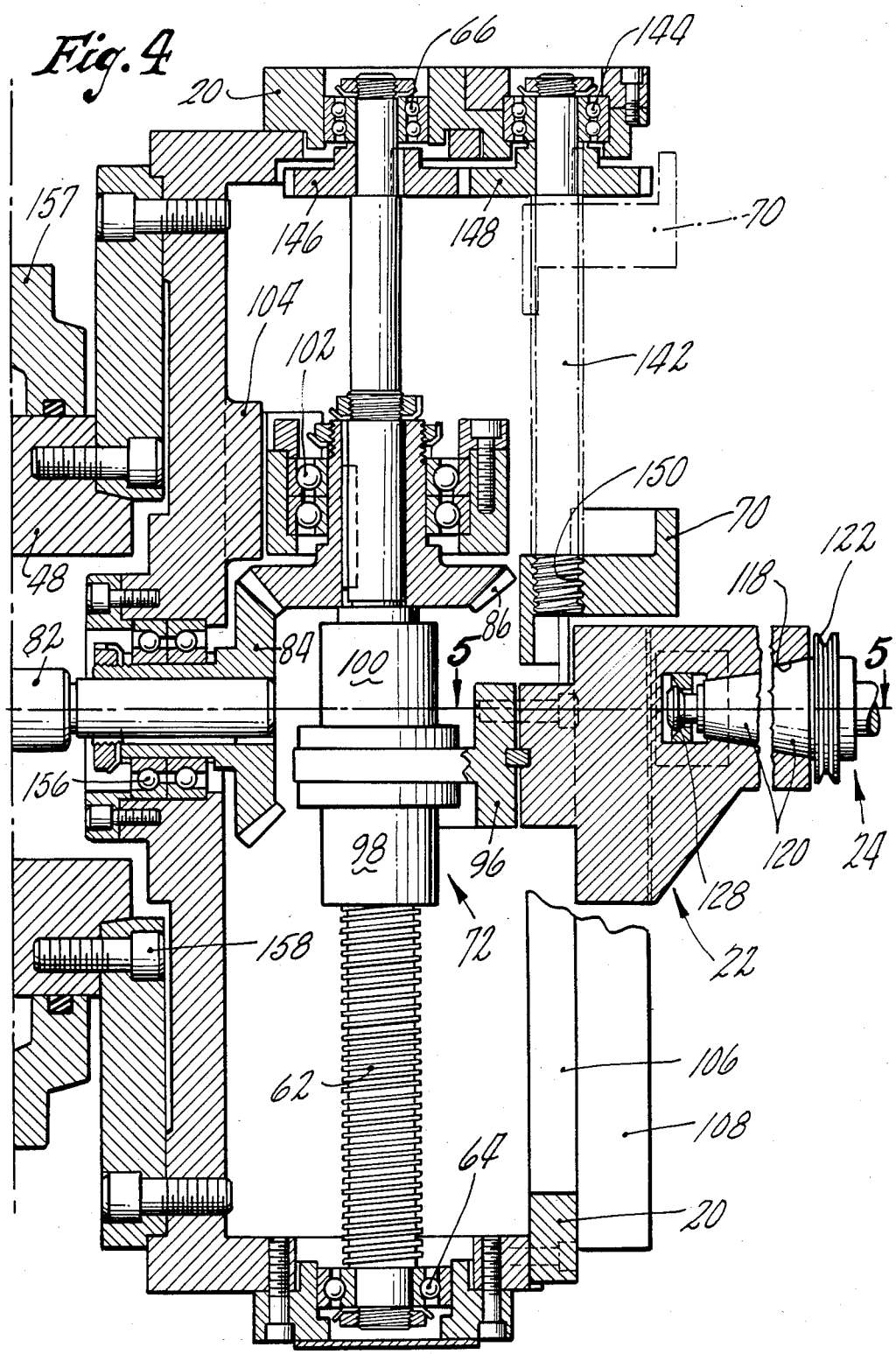
FIG. 4 is a sectional side elevational view of the machining head of the machine tool of FIG. 1.

Turning now to FIG. 4, a cross sectional view of a machining head of a preferred embodiment of the invention is presented. The drive screw 62 is constituted by a precision ball screw which carries a ball nut unit comprising a block traveler 96 and two ball nuts 98 and 100, preloaded against backlash, disposed on either side thereof, to thereby form the follower 72. The beveled drive gear 86 is keyed to an intermediate segment of the drive screw 62 and is itself also mounted upon a bearing 102 positioned within a bearing housing 104 in the machining head 20.

Figure 5:
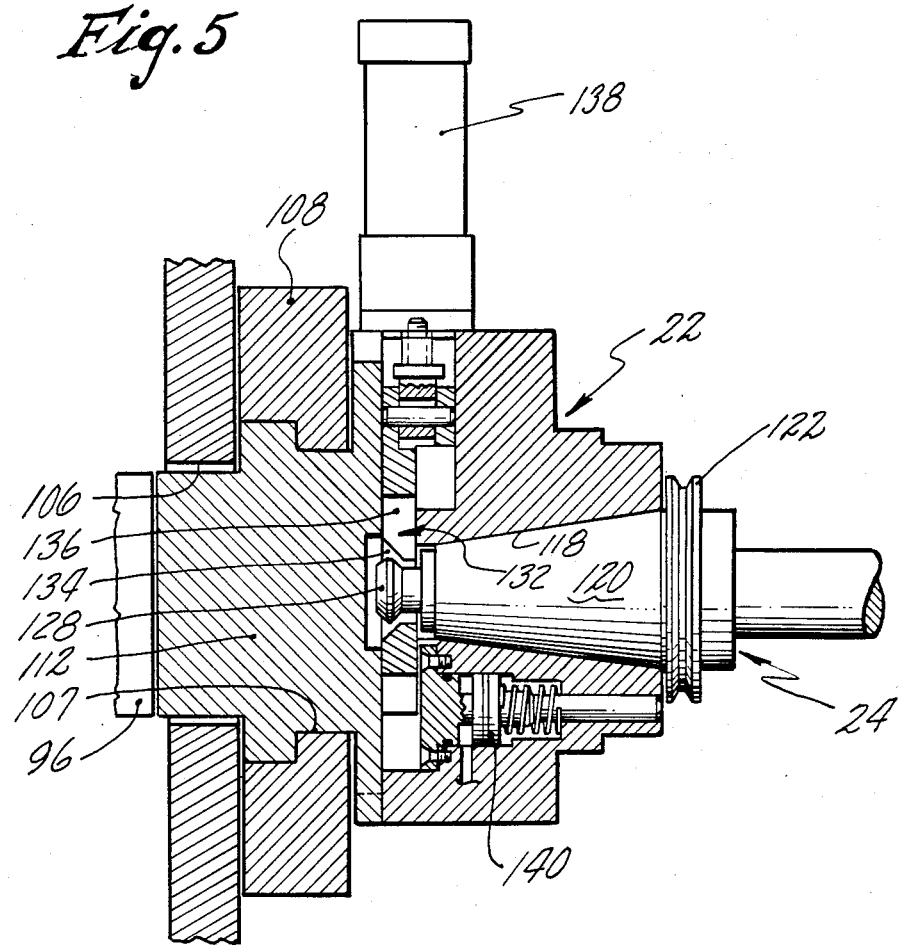
FIG. 5 is sectional view of the tool holder taken along the line 5—5 of FIG. 4.

The machining head 20 has an elongated slot 106 (FIGS. 1,4, and 6) in the front face through which the tool block 22 and the counterbalance block 70 extend. A pair of straps or guides 108 and 110 are fixedly mounted upon the face of the machining head 20 in straddling relationship to the slot 106 so as to define a slot 107 for guiding the radial movement of the tool block 22 and the counter balance block 70 (FIG. 7). As best shown in FIG. 5, the tool block 22 has a runner 112 which mates with the slot 107 for sliding movement therein in order to guide movement of the follower and tool block assembly.

Figure 6:
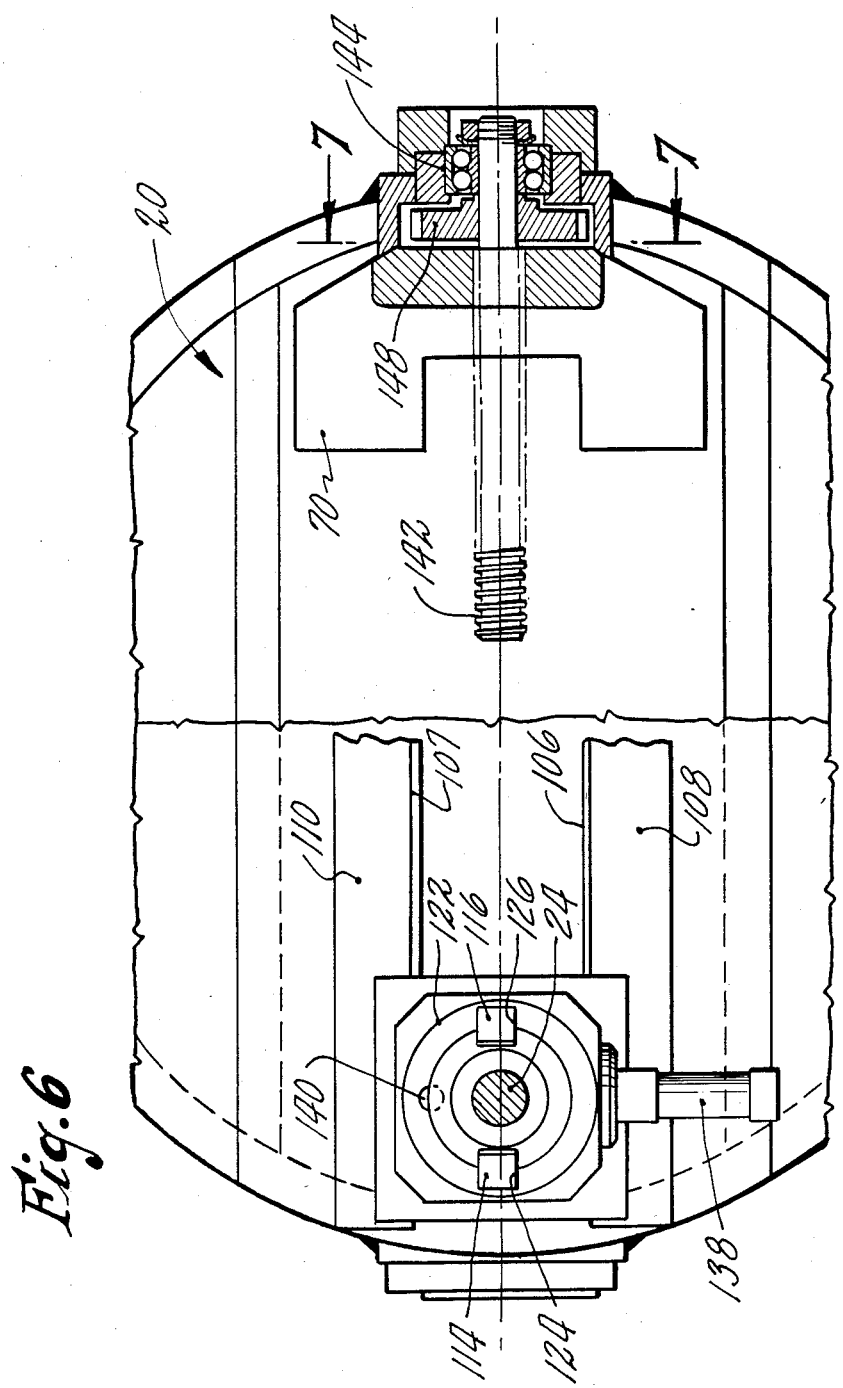
FIG. 6 is a front elevational view, partly broken away, of the machining head of the machine tool of FIG. 1.
Figure 7:
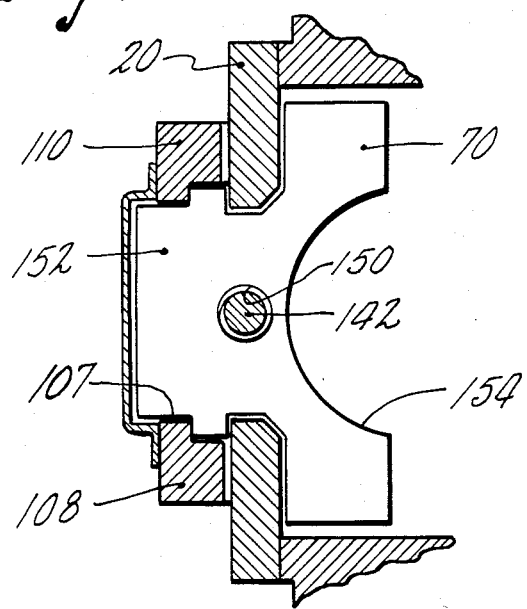
FIG. 7 is a sectional view of the machining head, taken substantially along the line 7—7 of FIG. 6.

With particular reference to FIGS. 4,5, and 6, it will be seen that the depicted tool block 22 is generally similar in construction to the tool operator in a conventional spindle. It will, however, be appreciated that the tool block could, if desired, be of a radically different design. The tool block 22, which includes drive keys 114 and 116, is adapted to accommodate and secure a standard tool for drilling, milling, reaming, taping, contouring, threading or other operations. The tool block 22 is formed with a tapered socket 118 for receiving the correspondingly tapered shank 120 of the tool 24. The tool 24, which is of conventional construction, is formed with a gripping flange 122 for handling by the tool transfer arm 44 of FIG. 1 and a pair of diametrically opposed keyways 124 and 126 adapted to register with the drive keys on the spindle. The tool 24 also incorporates a lug 128 having a narrow neck and an enlarged diameter head. A slide 130 is mounted for axial movement in the tool block 22 and incorporates a contoured slot 132 in which is received the neck of the lug 128. The slot has a narrow segment 134 which is coextensive with the lug when the slide 130 is in its locking position and a wider segment 136 which is coextensive with the lug 128 when the slide 130 occupies its unlocking position. When the slide is in the illustrated position, the tool 24 cannot move from the socket. However, when the slide 130 is moved downwardly, the lug can freely pass through segment 136 of slot 132, thereby permitting the tool 24 to be removed from the tool block 22 or inserted therein. Locking and unlocking motions of the slide are produced by an air operated piston assembly 138. The tool block 22 is also provided with the usual air operated knock-out pin 140 for engaging the gripping flange on the tool 24 to facilitate release of the tool 24 from its socket.

Turning next to the counterbalance block 70 and its driving arrangement, as best illustrated in FIGS. 4, 6, and 7, it will be noted that the counterbalance block 70 is mounted for reciprocating radial movement upon a threaded shaft 142 which is in spaced parallel relationship to the drive screw 62. The rationale behind such an arrangement is that the illustrated machining head 20 is of a relatively compact design, where space is at a premium. The provision of a second shaft to carry the counterbalance block 70 permits the block 70 to travel alongside the beveled drive gear 86 without interference therebetween, whereby the diameter of the head 20 can be minimized. It should be apparent, however, that the counterbalance block 70 could readily be mounted upon the same shaft (or aligned shafts) which supports the follower and tool block assembly and that other means of dynamic balance could be utilized such as a fluid receiving chamber or other known arrangements for achieving dynamic balance in rotating structures.

The shaft 142 is preferably an Acme thread (since great position accurancy is not required) having its outboard extremity mounted for rotation by means of a bearing 144. A driving connection is established between the drive screw 62 and the shaft 142 by meshing gears 146 and 148, respectively mounted adjacent to the upper extremities of the drive screw 62 and the shaft 142. Hence, rotation of the drive screw 62 results in a corresponding rotation of the shaft 70.

The counterbalance block 70 has a threaded bore 150 in threaded engagement with the shaft 142 so as to undergo radial movement upon rotation of the shaft 142. The counterbalance block 70, as is the case with the tool block 22, comprises a runner 152 which is received within the slot 107 such that radial motion of the counterbalance block is guided by the engagement between the runner 152 and the walls of the slot 107. As best shown in FIG. 7, the counterbalance block 70 incorporates a recess 154 in its base to provide clearance for the beveled drive gear 86.

Referring more particularly to FIG. 4, it will be noted that the bevel gear pinion 84 is keyed to the front end of the drive shaft 82 for rotation therewith within a bearing 156 mounted in the central rear portion of the maching head 20. As shown in FIG. 4, the machining head 20 is secured to the spindle 48, adjacent a spindle cover 157, by means of bolts 158.

Figure 8:
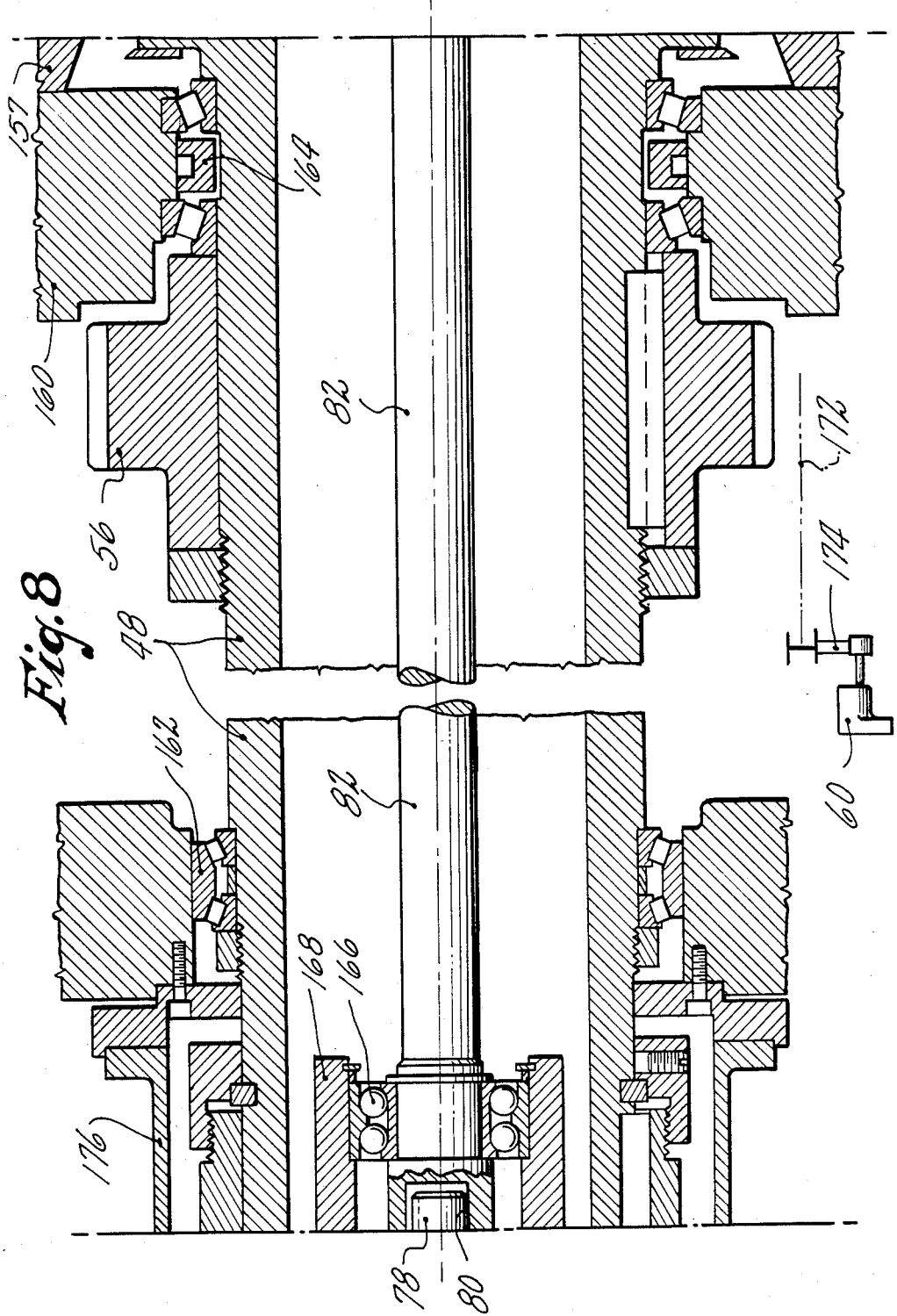
FIGS. 8 and 9 are sectional side elevational views of the front and rear portions, respectively, of the machine tool of FIG. 1 showing the spindle and its relationship to the machining head and the drive motor.
Figure 9:
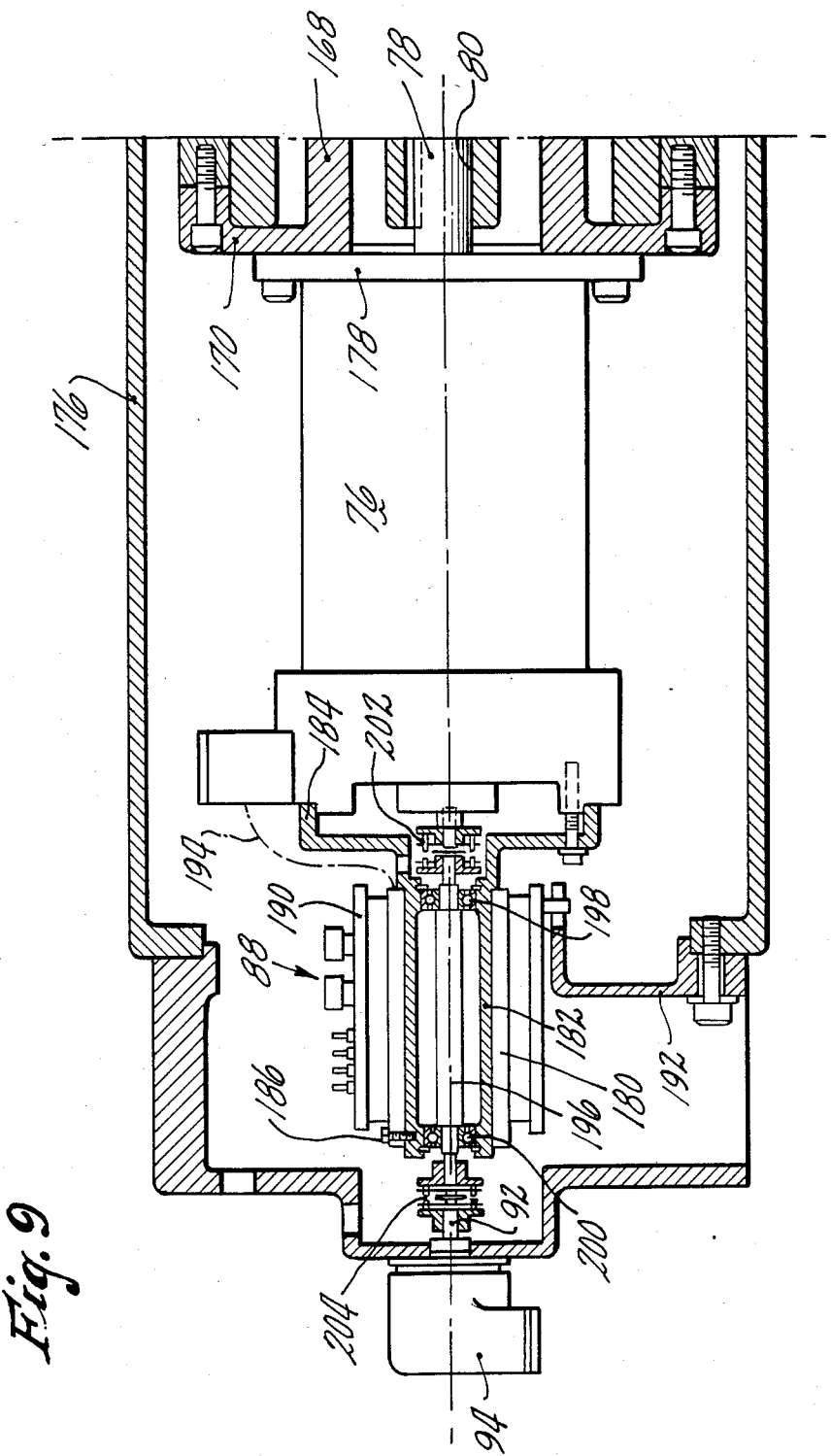

As can be more fully appreciated from reference to FIG. 8, the spindle 48 is relatively supported within the gearbox housing 160 by journal assemblies 162 and 164 in the manner of that of a conventional machine tool spindle. Similarly, the spindle drive gear 56 is keyed to the spindle in the usual way. The drive shaft 82 is supported adjacent its rear end by a bearing 166 mounted within the tubular extension 168 of a spindle cover 170 (FIG. 9). The rotational speed of the spindle is transmitted to the incremental position transducer 60 by a shaft 172 in the gearbox which is connected to the transducer 60 via a pulley 174, the shaft being indicated by a phantom line.

FIG. 9 shows the manner of attachment of the servo motor 76 to the spindle 48 with which it rotates and to the slip-ring assembly 88 and incremental position transducer 94. The motor 76 and slip-ring assembly 88 are contained within a headstock end cover 176. The motor 76 has a forward flange 178 which is bolted onto the spindle cover 170, whereby the motor 76 is rotatable with the spindle 48. The rear of the motor is fixedly connected to the rotor 180 of the slip-ring assembly through the instrumentality of a cylindrical sleeve 182 having a flange 184 bolted onto the rear of the housing of the motor 76. The sleeve 182 is secured to the inner periphery of the rotor 180 by suitable screws 186. The stator 190 of the slip-ring assembly 88 is mounted upon a bracket 192 attached to the headstock end cover 176. The slip-ring assembly 88 is connected to an appropriate source of power (not shown) which is communicated in the motor 76 via rotor leads 194, depicted as a dashed line.

A shaft 196, extending through the sleeve 180 in coaxial relationship therewith, is mounted therein for rotation by bearings 198 and 200. The front and rear ends of the shaft 196 are respectively connected to the rear motor shaft extension 90 and the input shaft 92 of the transducer 94 by well-known Renbrandt couplings, viz.: 202 and 204, which offer torsional rigidity so as to forestall any backlash and radial flexibility to accommodate deviations in axial alignment. When the motor 76 is not operating, the transducer shaft 92 is rotated at the same speed or RPM as that of the spindle 48. However, when the motor 76 is running, the transducer shaft 92 is rotated at an RPM equal to that of the spindle 48 plus or minus the RPM of the motor 76. Because of the aforedescribed arrangement, static friction will be available to maintain the follower and tool block assembly in a given radial position when the motor 76 is not running because the motor 76, the shaft 78, and the drive shaft 82 will turn in unison with the spindle 84.

Figure 10:
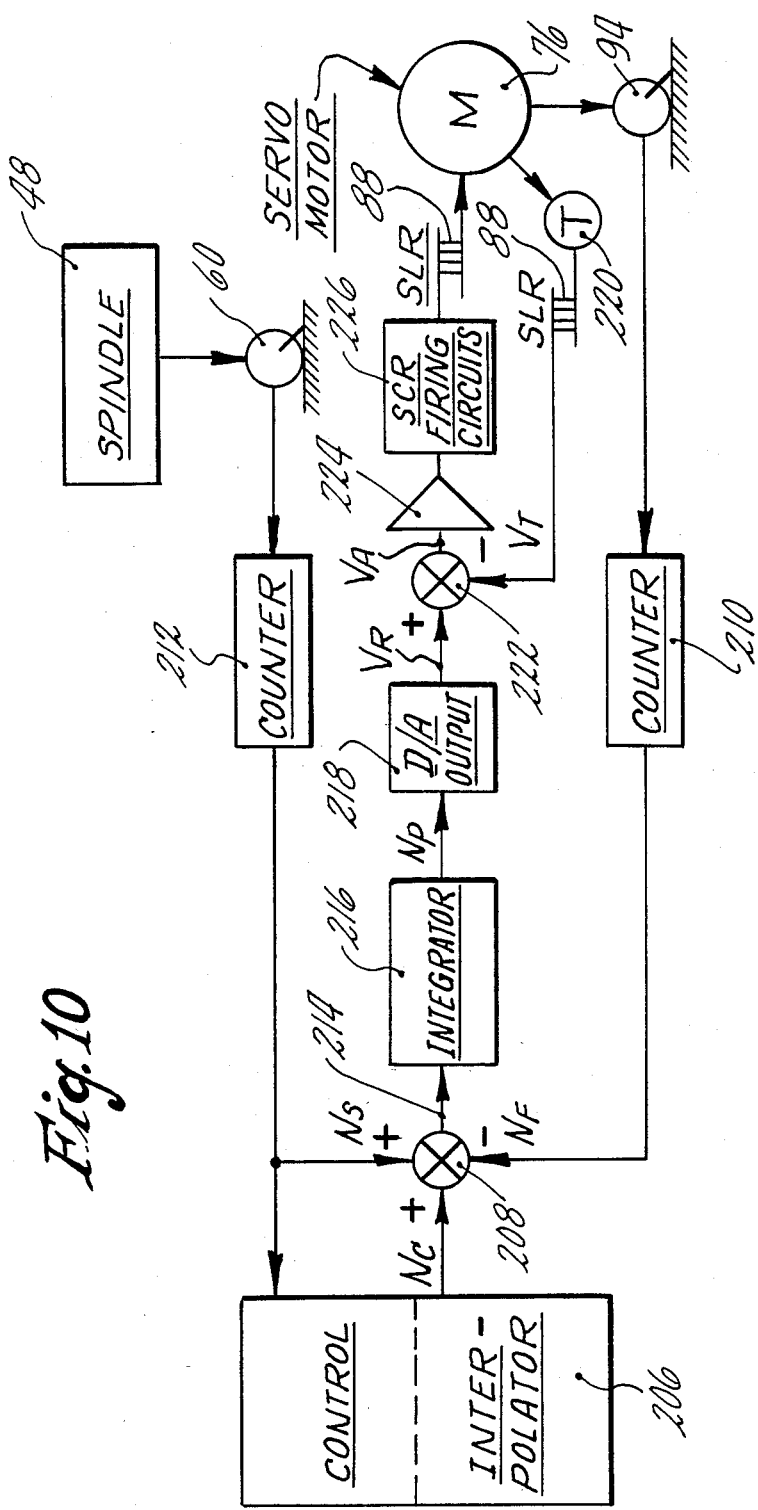
FIG. 10 is a block diagram showing a preferred control system for the machine tool of FIG. 1.

A simplified block diagram showing the operating prosesses of a preferred from of a servo system, employed with respect to the radial axis in the present invention is presented in FIG. 10. A computer numerical controller has a control and interpolation section 206 which periodically generates a velocity command number Nc, which is indicative of the commanded radial velocity of the follower and tool block assembly as dictated by the RPM of the motor 76 relative to spindle 48. The number Nc is passed to a summing register 208 which receives as a second input a number or data word Nf indicative of the actual RPM of the shaft 82. A third input applied to the summing register 208 is in the form of number or data word Ns indicative of the actual RPM of the spindle 48. The summing register in essence calculates the difference (Ns-Nf) between the two inputs Ns and Nf and adds it to the command input Nc. Obviously when the spindle 48 and the drive shaft 82 are turning in unison Ns and Nf will be equal, and hence, the output of the summing register 208 be effectively zero providing the number Nc is not calling for radial motion.

The pulses from the incremental position transducer 94 are applied to the input of a counter 210 which accumulates the pulses. The contents of the counter 210 are periodically examined and the difference between the contents on two successive interrogations, viz.: Nf, is representative of the actual RPM of the shaft 82 relative to the headstock. The number Ns is derived in a similar manner from a counter 212 associated with the spindle incremental position transducer 60 and is indicative of the actual RPM of the spindle 48 relative to the headstock. Counter interrogations and command number generations may be made at the rate of about 120 per second or every 8.3 milliseconds.

The output of the summing register 208 is made available on an output line 214, which is connected to the input of an integrator 216, where the summing register output is algebraically added to the number or data word previously stored therein. As a result, the content of the integrator corresponds to the position error on the radial axis of the radial slide, i.e., the difference between the radial position called for by the Nc program at any given time and the actual radial position. The contents Np of the integrator 216 may also be considered as the accumulated position error as it is the sum of incremental position errors.

The output number or data word Np of the integrator 216, which represents position error, is applied to a digital to analog converter 218 which generates a DC reference voltage Vr proportional to the number Np. As previously mentioned, the servo motor 76 incorporates a tachometer 220 in its housing. This tachometer generates a voltage Vt proporational to the speed of the motor 76, (the speed of shaft 82 relative to spindle 48) which is transmitted through the slip-ring assembly 88 to a summing device 222. The summing device functions to subtract the voltage Vt from the voltage Vr and provides as an output a voltage Va which is applied to a DC drive amplifier 224. The DC drive amplifier includes an integrating amplifier (e.g., an operational amplifier with a capacitance in the feedback loop). The voltage generated by DC drive amplifier 224 represents radial axis velocity error. The output of the DC drive amplifier 224 may be employed in the usual way as by, for example, applying it to a threshold comparator which also has as an input a ramp wave form. As processed, the signal from the D drive amplifier is applied to SCR firing circuits 226 which are connected to the motor 76 through the slip-ring assembly 88.

It will be appreciated that, for the sake of simplicity, the block diagram of FIG. 10 does not include representations of the necessary scalers to be found in a typical lead-lag compensation scheme for a velocity servo system. Moreover, the specialized circuitry for controlling amplifier saturation and armature current has been omitted.

Suffice it to say, that the precise nature of the control to be associated with a machine of the invention admits of many variations. The essential attribute of a control for a machine of the invention is that it be capable of accurately positioning the tool along the radial axis and controlling its velocity therealong. Since the spindle may be operated under numerical control as in any conventional NC lathe and the headstock may be longitudinally positioned as a slide or headstock in any conventional NC machine tool, no description of a servo system applicable to these elements has been included herein.

In operation, the headstock 18 will move longitudinally while the tool 24 in the rotating machining head undergoes selected radial movements to form a desired contour on a stationary workpiece. It will be appreciated that could be a workpiece that is of too great a size to be rotated on a conventional lathe or chucker. By aligning the tool 24 with the spindle axis, conventional drilling and milling work can be performed as in a typical machining center. Milling work will, or course, mandate inclusion of a table movable along at least one axis, which has not been depicted. Tools can be changed manually or by positioning the tool block 22 in a tool change station (see FIGS. 1 and 2) and moving the headstock to a tool changing station. For threadcutting work with respect to straight or tapered threads, the machining head 20 may be placed in a predetermined angular orientation as would be a workpiece in a conventional lathe.

Obviously, many modifications and variations are possible in light of the above teachings without departing from the scope or spirit of the invention as defined in the appended claims. For example, the motor 76 could be mounted in the machining head 20 with the shaft 82 being utilized as a position feedback device. Moreover, the headstock could be fixedly mounted and the work supporting table movable in the longitudinal direction. In addition, the headstock 18 or work supporting table 26 could be adapted for movement along other axes. It will further be appreciated that tool deflection at high RPM's could also be compensated will be a function of the centrifugal force exerted thereupon which is a function of the tools radial position and the spindle speed.

What is claimed is:

1. An improved machine tool with a rotating cutting tool of the type having a headstock, a spindle mounted for rotation about an axis in the headstock; a position transducer operatively connected to the spindle for generating a pulse frequency indicative of the actual RPM thereof relative to the headstock; wherein the improvement comprises:

a machining head integral with the spindle;

a precision drive screw mounted for rotation in the machining head with its axis extending radially of the spindle axis;

a radial slide mounted upon the drive screw in threaded engagement therewith for radial movement in response to rotation of the drive screw about its axis, the radial slide being adapted to receive the cutting tool;

a threaded shaft mounted for rotation in the machining head in driving connection with the drive screw and having a threaded section;

a counterbalance block mounted upon the threaded section of the threaded shaft in threaded engagement therewith such that when the drive screw is rotated opposite radial movements of the radial slide and the block are produced;

a drive shaft extending through the spindle in driving connection with the drive screw such that rotation of the drive shaft relative to the spindle produces rotation of the drive screw about its axis;

a servo motor, having a shaft, fixedly mounted upon the spindle for rotation therewith and having its shaft in driving connection with the drive shaft for producing drive shaft rotation relative to spindle;

a position transducer operatively connected to the servo motor for generating a pulse frequency indicative of the actual RPM of the shaft of the servo motor relative to the headstock; and a numerical controller operatively connected to the position transducers and having means for generating a command signal indicative of the desired RPM of the shaft of the servo motor relative to the spindle, means for generating a first signal indicative of the actual RPM of the shaft of the servo motor relative to the headstock, means for generating a second signal indicative of the actual RPM of the spindle relative to the headstock, means to substract the first signal from the sum of the command signal and the second signal for producting a velocity error signal and means to integrate the velocity error signal to provide a position error signal.

2. A machine tool as defined in claim 1, wherein the radial slide comprises:

a ball nut unit in threaded engagement with the drive screw; and a tool block attached to the ball nut unit, the tool block having a socket for receiving tools.

3. A machine tool, as defined in claim 2, wherein the radial slide is movable between a radially inner position in which the socket is aligned with the spindle and a radially outer position in which the socket is parallel to the spindle, the alignment of the socket and the spindle permitting machining operations such as drilling and milling.

4. A machine tool, as defined in claim 1, wherein the threaded shaft comprises:

an extension of the drive screw.

5. A machine tool comprising:

a headstock;

a spindle assembly mounted for rotation about an axis upon the headstock;

a radial slide adapted to hold a cutting tool mounted upon the spindle assembly for radial movement along an axis extending radially of the axis of rotation of the spindle assembly;

a counterbalance structure mounted in spindle assembly to generate a variable centrifugal force in opposition to that of the radial slide for providing dynamic balance of the spindle assembly during rotation;

a motor mounted upon the spindle assembly for rotation therewith, the motor being in driving association with the radial slide such that the speed of the motor is proportional to the radial velocity of the radial slide;

a slip-ring assembly mounted on the headstock for supplying power to the motor;

an incremental position transducer mounted upon the headstock and operatively connected to the motor for sensing the sum of the speed of the spindle assembly and the speed of the motor; and an incremental position transducer mounted upon the headstock and operatively connected to the spindle assembly for sensing the speed of the spindle assembly.

6. A machine tool, as defined in claim 5, further comprising:

means to sum quantities indicative of a commanded motor speed, the speed of the spindle assembly and the sum of the speed of the spindle assembly and the speed of the motor for producing a quantity indicative of the speed error of the motor.

7. A machine tool comprising:

a headstock;

a spindle assembly mounted for rotation about an axis upon the headstock;

a radial slide adapted to hold a cutting tool parallel to the axis of rotation of the spindle assembly mounted in the spindle assembly;

drive screw means for radially moving the radial slide along an axis extending radially of the axis of rotation of the spindle assembly between a radially inner position in which the cutting tool is aligned with the axis of rotation of the assembly and a radially outer position in which the cutting tool is spaced from the axis of rotation of the assembly;

counterbalance means responsive to the radial positioning of the radial slide to generate a variable centrifugal force in opposition to that of the radial slide for providing dynamic balance of the spindle assembly during spindle assembly rotation;

a motor mounted upon the spindle assembly for rotation therewith;

drive means to establish a driving connection between the motor and the drive screw such that the speed of the motor is proportional to the radial velocity of the radial slide;

transducer means to sense the sum of the speed of the spindle assembly and the speed of the motor and generate a series of pulses having a frequency proportional thereto;

transducer means to sense the speed of the spindle assembly and generate a series of pulses having a frequency proportional thereto; and means responsive to the pulses generated by the first and second mentioned transducer means to sum quantitites indicative of a commanded motor speed, the sum of the speed of the spindle assembly and the speed of the motor and the speed of the spindle assembly for producing a quantity indicative of the speed error of the motor.

8. A machine tool, as defined in claim 7, further comprising:

transducer means to sense the sum of the speed of the spindle assembly and the speed of the motor and generate a series of pulses having a frequency proportional thereto;

transducer means to sense the speed of the spindle assembly and generate a series of pulses having a frequency proportional thereto; and means responsive to the pulses generated by the first and second mentioned transducer means to sum quantities indicative of a commanded motor speed, the sum of the speed of the spindle assembly and the speed of the motor and the speed of the spindle assembly for producting a quantity indicative of the speed error of the motor.

9. A method of operating a machine tool having a machining head which is rotatable about an axis and a radial slide carrying a cutting tool mounted in the machining head for radial movement, comprising the steps of:
moving the slide radially by rotating a drive screw in engagement therewith;
counterbalancing the centrifugal force exerted by the radial slide on the machining head;
sensing a parameter indicative of the combined speeds of rotation of the machining head and the drive screw; and
sensing a parameter indicative of the speed of rotation of the machining head.

10. The method of claim 9, further comprising the step of:
moving the slide radially to align the cutting tool with the axis of rotation of the machining head.

11. The method of claim 9, further comprising the step of:
moving the machining head along its axis of rotation while maintaining a workpiece being operated on by the cutting tool in a stationary position.

12. In a machine tool with a rotating cutting tool of the type having a headstock, a spindle mounted for rotation about an axis in the headstock and a machining head in driving connection with the spindle, the improvement comprising:
a precision drive screw mounted for rotation in the machining head with its axis extending radially of the spindle axis;
a beveled drive gear mounted upon the drive screw;
a radial slide mounted upon the drive screw in threaded engagement therewith for radial movement in response to rotation of the drive screw about its axis, the radial slide being adapted to receive the cutting tool;
a threaded shaft mounted for rotation in the machining head in driving connection with the drive screw and in parallel spaced relationship thereto, the threaded shaft having a threaded section, a portion of the threaded section extending alongside the drive gear;
a counterbalance block mounted upon the threaded section in threaded engagement therewith and in a generally diametrically opposed position to the radial slide such that rotation of the drive screw produces opposite radial movements of the radial slide and the block whereby the block may generate a centrifugal force in opposition to that of the radial slide for providing dynamic balance during spindle rotation, the block being shaped such that it may travel upon the threaded section alongside the drive gear without interference therebetween; and
a servo motor in driving connection with the drive gear for rotating the drive screw relative to the machining head.

13. The improvement of claim 12, wherein the servo motor is fixedly mounted upon the spindle for rotation therewith.

14. The improvement of claim 13, further comprising:
a position transducer mounted upon the headstock and operatively connected to the servo motor.

15. The improvement of claim 12, wherein the radial slide comprises:
a ball nut unit in threaded engagement with the drive screw; and
a tool block attached to the ball nut unit, the tool block having a socket for receiving tools.

16. The improvement of claim 12, further comprising:
a bed; and
a pair of longitudinally extending ways mounted upon the bed, the headstock being positioned upon the ways for longitudinal reciprocating movement thereover.

17. A machine tool, as defined in claim 12, wherein the machine tool is of the type having a position transducer operatively connected to the spindle for generating a pulse frequency indicative of the actual RPM thereof relative to the headstock, and wherein the improvement further comprises:
a position transducer operatively connected to the servo motor for generating a pulse frequency indicative of the actual RPM of the shaft of the servo motor relative to the headstock; and
a numerical controller operatively connected to the position transducers and having means for generating a command signal indicative of the desired RPM of the shaft of the servo motor relative to the spindle, means for generating a first signal indicative of the actual RPM of the shaft of the servo motor relative to the headstock, means for generating a second signal indicative of the actual RPM of the spindle relative to the headstock, means to sbustract the first signal from the sum of the comman signal and the second signal for producing a velocity error signal and means to integrate the velocity error signal to provide a position error signal.

18. The improvement, as defined in claim 12, wherein the machining head includes a slot and wherein the radial slide and the block are mounted within the slot for sliding movement therein.

* * * * *